Feb. 12, 1963 C. W. JACKLE 3,077,598
MARKER GENERATOR
Filed Oct. 29, 1959
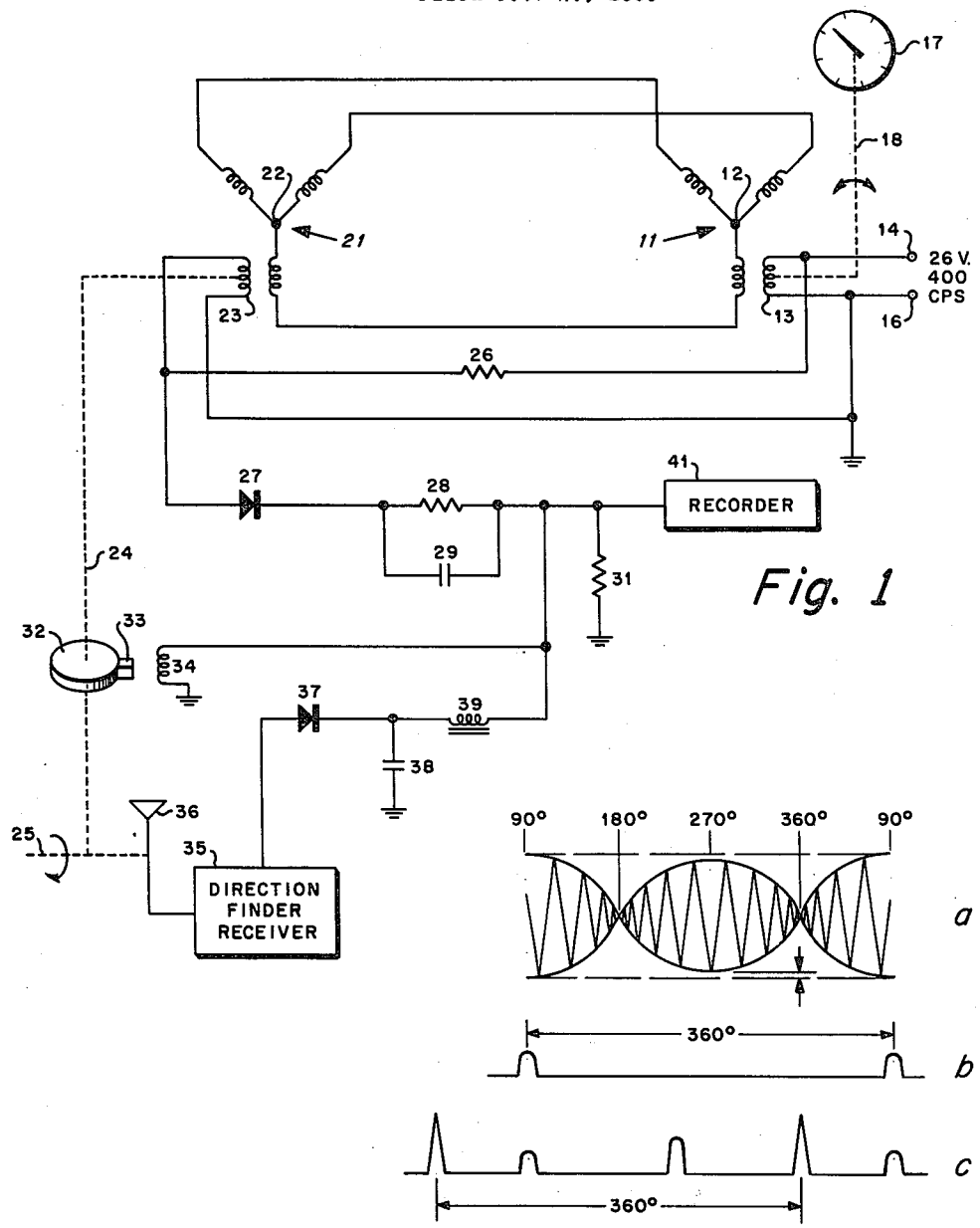
Fig. 1
Fig. 2
INVENTOR.
CARL W. JACKLE
BY
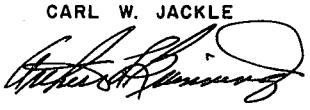
AGENT 3,077,598
MARKER GENERATOR
Carl W. Jackle, Willow Grove, Pa., assignor to the United States of America as represented by the Secretary of the Navy
Filed Oct. 29, 1959, Ser. No. 849,694
9 Claims. (Cl. 343—118)
(Granted under Title 35, U.S. Code (1952), sec. 266)

The invention described herein may be manufactured and used by or for the Government of the United States of America for governmental purposes without the payment of any royalties thereon or therefor.

The present invention relates to a marker generator and more particularly to a marker generator which in combination with other elements may be utilized to monitor the performance of airborne direction finding equipment of the type wherein there is provided a radio or radar direction finder receiver coupled to a rotatable antenna.

The marker generator of the present invention comprises a synchro system including a synchro transmitter, a driven synchro control transformer, and wave shaping circuits, wherein a pulse is generated once during each revolution of the synchro control transformer rotor corresponding in time to the angular position of the synchro transmitter rotor. There is further provided a reference pulse generator including a driven element coupled to the synchro control transformer rotor and to the rotatable antenna of the direction finder receiver for conjoint rotation, and means to terminate the marker generator, reference pulse generator, and direction finder receiver output signals in a common load impedance, whereby the signals may be recorded or displayed on a common time base. The time displacement of the signals provides true and relative bearing information.

It is therefore an object of the present invention to provide a system operable to monitor the operation of direction finding equipment.

It is another object of the invention to provide a novel marker generator particularly useful in a system of the type described in the next preceding object.

It is still another object of the present invention to provide a novel marker generator wherein a chain of pulses is generated corresponding in time to the angular position of a shaft.

Other objects and many of the attendant advantages of this invention will be readily appreciated as the same becomes better understood by reference to the following detailed description when considered in connection with the accompanying drawings wherein:

FIG. 1 is a circuit diagram of an embodiment of the invention, and

FIGS. 2a, 2b, and 2c depict illustrative waveforms occurring in the circuit of FIG. 1.

Referring now to FIG. 1, there is shown a marker generator which comprises a synchro transmitter 11 provided with a stator 12 and a rotor 13. Rotor 13 is electrically coupled to a pair of terminals 14, 16 to be energized by a carrier signal applied thereto and mechanically coupled to an indicator 17 by an angularly positionable shaft 18.

In a contemplated use of the invention, the portions thus far described may comprise part of the compass system of an aircraft. Accordingly, in this embodiment of the invention, rotor 13 is angularly positioned in accordance with the true heading of the aircraft.

Stator 12 of synchro transmitter 11 is coupled to stator 22 of a synchro control transformer 21 which is provided with a rotor 23 mechanically coupled by a shaft 24 to a driven shaft 25 for continuous rotation.

Rotors 13, 23 are connected in parallel by a resistor 26 whereby a portion of the carrier signal applied to terminals 14, 16 is directly applied to rotor 23.

The resultant signal from rotor 23 is coupled through a peak detector and a wave shaping circuit comprising a crystal diode 27, a resistor 28, and a shunt capacitor 29 and applied across a load impedance comprising a resistor 31. The crystal detector in conjunction with the time constant of the R-C network functions to pass only peak amplitude signals as is known in the art.

In the illustrated embodiment of the invention there is provided a reference pulse generator which comprises a cylindrical yoke member 32 supporting a permanent magnet 33 and mechanically coupled to shaft 24. A pickup coil 34 having one terminal thereof connected to ground and the other terminal thereof connected to load resistor 31 is located closely adjacent to the path of rotation of magnet 33 whereby a pulse is induced in pickup coil 34 once during each complete rotation of shaft 24.

There is further shown in FIG. 1 a direction finder receiver 35 having the input circuit thereof electrically coupled to a rotatable antenna 36 which is mechanically coupled to shaft 25 for joint rotation with rotor 23 and magnet 33. The video or audio output signal from receiver 35 is coupled through a clipper and wave shaping circuit comprising a crystal diode 37, a capacitor 38 and a choke 39 and applied to load resistor 31.

The signals appearing across load resistor 31 may if desired be coupled to a recorder 41 which preferably may be of the magnetic tape type. Alternatively, or in addition, the output signals appearing across resistor 31 may be conventionally coupled to an oscilloscope (not shown) or appropriately coupled to the display system of the direction finder receiver.

The mode of operation of the present invention may best be understood by reference to the waveforms of FIGS. 2a, 2b and 2c.

Each time rotor 23 assumes an angular position orthogonal to the angular position of rotor 13, maximum carrier signal is induced in rotor 23. The phase of the carrier signal induced in rotor 23 reverses each time the rotor rotates through an angular position coincident with the angular position of rotor 13. During alternate half revolutions of rotor 23 the phase of the carrier signal coupled directly thereto through resistor 26 will be in phase opposition to the carrier signal induced therein. Accordingly, as may be seen by reference to FIG. 2a, maximum carrier output signal will be provided by the synchro portion of the marker generator only once during each revolution of rotor 23. As may be seen by reference to FIG. 2b the peak detector and wave shaping circuits described above convert the maximum carrier signals to a chain of pulses, the time of occurrence of which varies in accordance with the angular position of rotor 13.

The angular position of yoke 32 on shaft 24 may preferably be adjusted whereby a pulse is generated in coil 34 each time the axis of antenna 36 coincides with the aircraft heading.

FIG. 2c depicts, from left to right, the reference (heading), marker generator (compass), and video (signal intercept) pulses appearing across resistor 31 plotted on a common time scale to indicate the time relationship therebetween.

In the illustrated embodiment of the invention, the time displacement between the heading and compass pulses is proportional to the true heading of the aircraft; the time displacement between the heading and signal intercept pulses is proportional to the relative bearing of a radiating target with respect to the aircraft; and, the time displacement between the compass and signal intercept pulses is proportional to the true bearing to the radiating target.

Obviously many modifications and variations of the present invention are possible in the light of the above teachings. It is therefore to be understood that within the scope of the appended claims, the invention may be practiced otherwise than as specifically described.

What is claimed is:

1. In an aircraft, a system operable to monitor the performance of airborne direction finding equipment comprising: a direction finder receiver coupled to a rotatable antenna operable to provide an intercept signal, a heading pulse generator coupled to said antenna operable to generate a reference pulse at the time the axis of the antenna is aligned with the aircraft heading, a compass pulse generator coupled to the compass system of the aircraft operable to generate a pulse displaced in time with respect to said reference pulse in accordance with the true heading of the aircraft, a load impedance, circuit means coupling said reference and compass pulses in common with the intercept signal from said receiver to said load impedance, and recorder-display means coupled to be energized by the signals applied to said load impedance.

2. The combination of claim 1 wherein said compass pulse generator comprises: a pair of input terminals adapted to be coupled to a source of carrier voltage, a synchro transmitter having a stator and having a rotor with the windings thereof coupled to said input terminals, means mechanically coupling said rotor to the compass system of said aircraft, a synchro control transformer having a rotor and having a stator with the windings thereof coupled to the stator windings of said synchro transmitter, a rotatable driven element mechanically coupled to said antenna, means mechanically coupling said synchro control transformer rotor to said driven element for continuous rotation with said antenna, an impedance coupling the windings of said rotors in parallel, a peak detector and wave shaping circuit, and circuit means coupling the rotor winding of said synchro control transformer through said peak detector and wave shaping circuit to said load impedance.

3. The combination of claim 2 wherein said heading pulse generator comprises: a cylindrical yoke member mechanically coupled to said driven element and supporting a permanent magnet at the periphery thereof, and a pickup coil mounted closely adjacent the path of motion of said magnet and electrically coupled to said load impedance.

4. A marker generator comprising: a pair of input terminals adapted to be coupled to a source of carrier voltage, a synchro transmitter having a stator and having a rotor with the windings thereof coupled to said input terminals, means mechanically coupling said rotor to an angularly positionable member, a synchro control transformer having a rotor and having a stator with the windings thereof coupled to the stator windings of said synchro transmitter, a rotatable driven element, means mechanically coupling said synchro control transformer rotor to said driven element for continuous rotation, an impedance coupling the windings of said rotors in parallel, a load impedance, a peak detector and wave shaping circuit, and circuit means coupling the rotor winding of said synchro control transformer through said peak detector and wave shaping circuit to said load impedance.

5. In combination: a marker generator comprising a pair of input terminals adapted to be coupled to a source of carrier voltage, a synchro transmitter having a stator and having a rotor with the windings thereof coupled to said input terminals, means mechanically coupling said rotor to an angularly positionable member, a synchro control transformer having a rotor and having a stator with the windings thereof coupled to the stator windings of said synchro transmitter, a rotatable driven element, means mechanically coupling said synchro control transformer rotor to said driven element for continuous rotation, an impedance coupling the windings of said rotors in parallel, a load impedance, a peak detector and wave shaping circuit, and circuit means coupling the rotor winding of said synchro control transformer through said peak detector and wave shaping circuit to said load impedance; a reference pulse generator coupled to said driven element operable to generate a pulse once during each rotation of said driven element; and circuit means coupling said reference pulse to said load impedance.

6. The combination of claim 5 including recorder-display means coupled to be energized by the signals applied to said load impedance.

7. In combination: a marker generator comprising a pair of input terminals adapted to be coupled to a source of carrier voltage, a synchro transmitter having a stator and having a rotor with the windings thereof coupled to said input terminals, means mechanically coupling said rotor to an angularly positionable member, a synchro control transformer having a rotor and having a stator with the windings thereof coupled to the stator windings of said synchro transmitter, a rotatable driven element, means mechanically coupling said synchro control transformer rotor to said driven element for continuous rotation, an impedance coupling the windings of said rotors in parallel, a load impedance, a peak detector and wave shaping circuit, and circuit means coupling the rotor winding of said synchro control transformer through said peak detector and wave shaping circuit to said load impedance; and a reference pulse generator comprising a cylindrical yoke mechanically coupled to said driven element for rotation therewith, a permanent magnet supported at the periphery of said yoke, a pickup coil mounted closely adjacent the path of rotation of said magnet, and circuit means coupling said pickup coil to said load impedance.

8. The combination of claim 7 including a recorder-display means coupled to be energized by the signals applied to said load impedance.

9. In an aircraft, the combination comprising: a compass pulse generator comprising a pair of input terminals adapted to be coupled to a source of carrier voltage, a synchro transmitter having a stator and having a rotor with the windings thereof coupled to said input terminals, means mechanically coupling said rotor to the compass system of said aircraft, a synchro control transformer having a rotor and having a stator with the windings thereof coupled to the stator windings of said synchro transmitter, a rotatable driven element, means mechanically coupling said synchro control transformer rotor to said driven element for continuous rotation, an impedance coupling the windings of said rotors in parallel, a load impedance, a peak detector and wave shaping circuit, and circuit means coupling the rotor winding of said synchro control transformer through said peak detector and wave shaping circuit to said load impedance; a reference pulse generator comprising a cylindrical yoke mechanically coupled to said driven element for rotation therewith, a permanent magnet supported at the periphery of said yoke, a pickup coil mounted closely adjacent the path of motion of said magnet, and circuit means coupling said pickup coil to said load impedance; and recorder-display means coupled to be energized by the signals applied to said load impedance.

References Cited in the file of this patent

UNITED STATES PATENTS

| 2,624,043 | Gerwin et al. | Dec. 30, 1952 |
| 2,688,130 | Whitaker et al. | Aug. 31, 1954 |
| 2,907,029 | O'Meara et al. | Sept. 29, 1959 |
| 2,953,020 | Hunt | Sept. 20, 1960 |

FOREIGN PATENTS

| 546,350 | Canada | Sept. 17, 1957 |